(12) United States Patent
Väisänen et al.

(10) Patent No.: US 8,145,205 B2
(45) Date of Patent: Mar. 27, 2012

(54) METHOD AND APPARATUS FOR ESTIMATING SPEECH QUALITY

(75) Inventors: Mika Väisänen, Espoo (FI); Peter Jungner, Helsinki (FI); Johan Fagerström, Sjundeå (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 777 days.

(21) Appl. No.: 12/089,660

(22) PCT Filed: Oct. 17, 2005

(86) PCT No.: PCT/EP2005/055318
§ 371 (c)(1),
(2), (4) Date: Nov. 10, 2008

(87) PCT Pub. No.: WO2007/045273
PCT Pub. Date: Apr. 26, 2007

(65) Prior Publication Data
US 2009/0170499 A1 Jul. 2, 2009

(51) Int. Cl.
*H04B 17/00* (2006.01)
*H04J 3/00* (2006.01)
*H04W 24/00* (2009.01)

(52) U.S. Cl. ........ 455/423; 455/424; 455/425; 370/332; 370/333; 704/E19.002

(58) Field of Classification Search .......... 370/252, 370/333, 326, 329, 332; 455/63.1, 67.11, 455/67.13, 67.14, 423–425; 704/E19.002
See application file for complete search history.

(56) References Cited

U.S. PATENT DOCUMENTS

| 2004/0160979 A1* | 8/2004 | Pepin et al. .................... 370/462 |
| 2006/0250955 A1* | 11/2006 | Kallio ........................... 370/229 |
| 2006/0268845 A1* | 11/2006 | He et al. ........................ 370/352 |
| 2008/0151769 A1* | 6/2008 | El-Hennawey et al. ....... 370/252 |

FOREIGN PATENT DOCUMENTS

DE 4324292 C1 2/1995

OTHER PUBLICATIONS

Werner M. et al; "Quality control for AMR speech channels in GSM Networks"; Acoustics, Speech and Signal Processing 2004; Proceedings (ICASSP 04) IEEE Intenational Confernce on Montreal Quebec CA May 17-21, 2004; vol. 3, May 17, 2004; pp. 1076-1079 XP010778380 ISBN 0-7803-8484-9.

* cited by examiner

*Primary Examiner* — George Eng
*Assistant Examiner* — Bryan Pitt
(74) *Attorney, Agent, or Firm* — Roger S. Burleigh

(57) ABSTRACT

A method of estimating the quality of speech information associated with a voice call over a communication system comprising a core network and an access network where speech information is carried between the access network and the core network and within the core network in frames. The method comprises determining a rate of frame loss for frames transported between the access network and the core network and/or within the core network, and mapping the rate of frame loss to a quality estimation value using data collected by simulating frame loss on representative speech samples and determining quality estimation values for the damaged speech samples.

22 Claims, 2 Drawing Sheets

METHOD AND APPARATUS FOR ESTIMATING SPEECH QUALITY

FIELD OF THE INVENTION

The present invention relates to a method and apparatus for estimating speech quality in a communications network and is applicable in particular, though not necessarily, to estimating speech quality in a Universal Mobile Telecommunications Network.

BACKGROUND TO THE INVENTION

In almost all communication networks carrying speech information there is a possibility that the quality of the speech will be degraded by interference or damage. In the case of digital networks, transmission quality is generally higher than with analogue networks, although network operators are always striving for improvements.

In the case of a Universal Mobile Telecommunications Network (UMTS) cellular system, speech data is compressed to conserve bandwidth and is transported end-to-end in a number of different frame structures. The maximum transmission quality that is achievable is limited by the speech compression algorithm used. However, some further degradation will result from damage to frames as they are transported over the radio leg(s) of the transmission path. Loss of complete frames might also occur. If the levels of damage and frame loss are significant, end users will perceive a reduced speech quality for received signals.

Traditionally, telephone network operators monitored quality by conducting sample calls and asking participants for their subjective opinion as to call quality. The International Telecommunications Union Telecommunication Standardization Sector (ITU-T) provides guidelines for performing listening tests in its recommendation P.800. The recommendation specifies the environment and settings in which listening tests should be carried out. By following the guidelines it is possible to attain comparable results from different test situations. In these tests untrained listeners evaluate the quality of the system under test by opinion rating. Usually, Absolute Category Rating (ACR) is used. ACR requires the listeners to evaluate the quality of the system by rating speech quality on a scale of one to five. The average of the ACR ratings (across all listeners) is called Mean Opinion Score (MOS).

Although subjective testing is inevitably the most accurate speech quality assessment method, it has its limitations. Performing listening tests is a time-consuming and expensive process and is impractical for widespread use in on operational networks. Hence the telecommunications industry has attempted to develop objective and automatic speech quality assessment methods.

Perceptual Evaluation of Speech Quality (PESQ) is an intrusive speech quality assessment algorithm standardised by ITU-T in recommendation P.862. The PESQ algorithm can be used to predict the subjective quality of narrow-band telephony and speech codecs in a variety of test conditions and applications. The PESQ algorithm takes its input samples in linear 16-bit PCM format, sampled with an 8 or 16 KHz sampling frequency. Ideal sample length is between 8 and 20 seconds. The algorithm uses a psychoacoustic perceptual model to calculate the difference between a reference speech sample and a degraded sample. The difference between the samples is mapped into a PESQ score, ranging from −0.5 to 4.5. As the MOS scale ranges from 1 to 5, the ITU-T has defined a mapping function which allows PESQ scores to be compared with subjective MOS scores. The PESQ algorithm has demonstrated acceptable accuracy in evaluating speech quality, taking into account the effects of transmission channel errors, transcoding, packet loss and packet loss concealment methods. The correlations between PESQ scores and subjective listening test results have been benchmarked to be around 0.935. However in some circumstances, such as evaluating packet loss with PCM type codecs, the correlation is reduced. Therefore PESQ can not be used to replace subjective testing completely.

The P.563 algorithm is a non-intrusive speech quality assessment method standardised by ITU-T in recommendation P.563. Unlike the PESQ algorithm, the P.563 algorithm does not need a reference sample to evaluate speech quality. Therefore the algorithm can be applied in live networks anywhere in the call chain.

In the case of the recently developed Voice over Internet Protocol (VoIP), objective and automatic speech quality estimation methods have emerged, for example VQMon™ from Telchemy Inc. and PsyVoIP™ from Psytechnics Ltd. Such methods try to estimate how the IP-network impairments (delay, jitter, packet loss) affect the speech quality of a VoIP-call. The impairments are analysed by looking at the Real Time Protocol RTP frames, which are used to carry the speech in VoIP. As the analysis is done on real traffic, it can be performed constantly and no separate test calls are necessary.

SUMMARY OF THE INVENTION

According to a first aspect of the present invention there is provided a method of estimating the quality of speech information associated with a voice call over a communication system comprising a core network and an access network where speech information is carried between the access network and the core network and within the access network in frames, the method comprising:
  determining a rate of frame loss for frames transported between the access network and the core network and/or within the core network; and
  mapping the rate of frame loss to a quality estimation value using data collected by simulating frame loss on representative speech samples and determining quality estimation values for the damaged speech samples.

In one embodiment of the invention, the method comprises determining said rate of frame loss by counting the number of lost frames and the number of damaged frames.

In an embodiment of the invention, only frames containing speech are considered, and silent frames are ignored. Thus, said rate is the number of lost (and damaged) speech frames relative to the total number of speech frames. Preferably, the method is applied to speech segments, e.g. of 5 second duration. The method may be applied to successive speech segments, to provide a continuously updated speech quality estimate.

Preferably, said step of mapping the rate of frame loss to a quality estimation value comprises performing said mapping using an empirically derived formula. This formula may have been derived by fitting a polynomial or other function to said collected data. In an alternative embodiment, this step may comprise indexing a look-up table containing frame loss rates (of representative speech samples) and respective quality estimation values.

The invention is applicable in particular to a Universal Mobile Telecommunications System (UMTS) network. In this case the method is preferably implemented at a Media Gateway of the UMTS Core Network. More particularly, the said frames on which the estimation is based may be the Nb frames where these frames are received from a peer Media Gateway over the Core network, or may be the Iu frames where these frames are received from a Radio Network Controller of the access network (UTRAN). The Media Gateway may perform the estimation on both Iu and Nb frames in order to estimate the quality of the voice call in both directions.

In an alternative embodiment of the invention, the method of the invention may be implemented at the Radio Network Controller of the access network, where said frames are Iu frames received from a Media Gateway of the core network.

According to a second aspect of the present invention there is provided apparatus for estimating the quality of speech information associated with a voice call over a communication system comprising a core network and an access network where speech information is carried between the access network and the core network and within the access network in frames, the apparatus comprising:

first processing means for determining a rate of frame loss for frames transported between the access network and the core network and/or within the core network; and second processing means for mapping the rate of frame loss to a quality estimation value using data collected by simulating frame loss on representative speech samples and determining quality estimation values for the damaged speech samples.

According to a third aspect of the present invention there is provided a Media Gateway comprising apparatus according to the above second aspect of the present invention.

According to a fourth aspect of the present invention there is provided a Radio Network Controller comprising apparatus according to the above second aspect of the present invention.

DETAILED DESCRIPTION OF CERTAIN EMBODIMENTS

Figure 1:
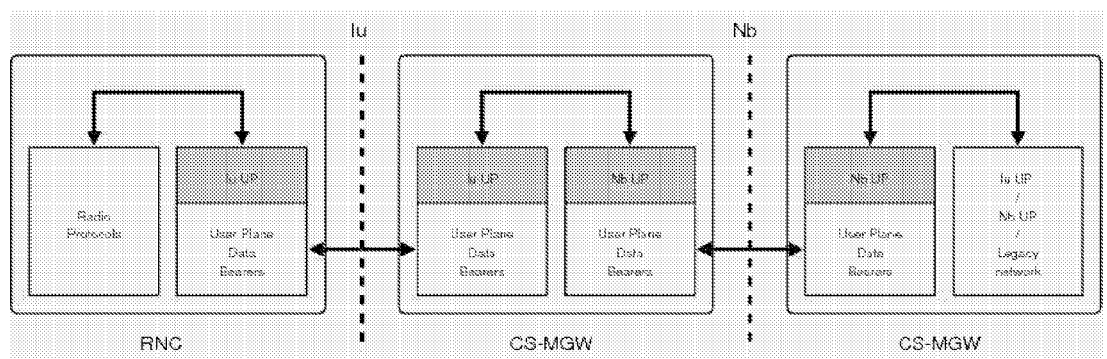
FIG. 1 illustrates schematically various nodes in a call chain within the a UMTS network.
Figure 2:
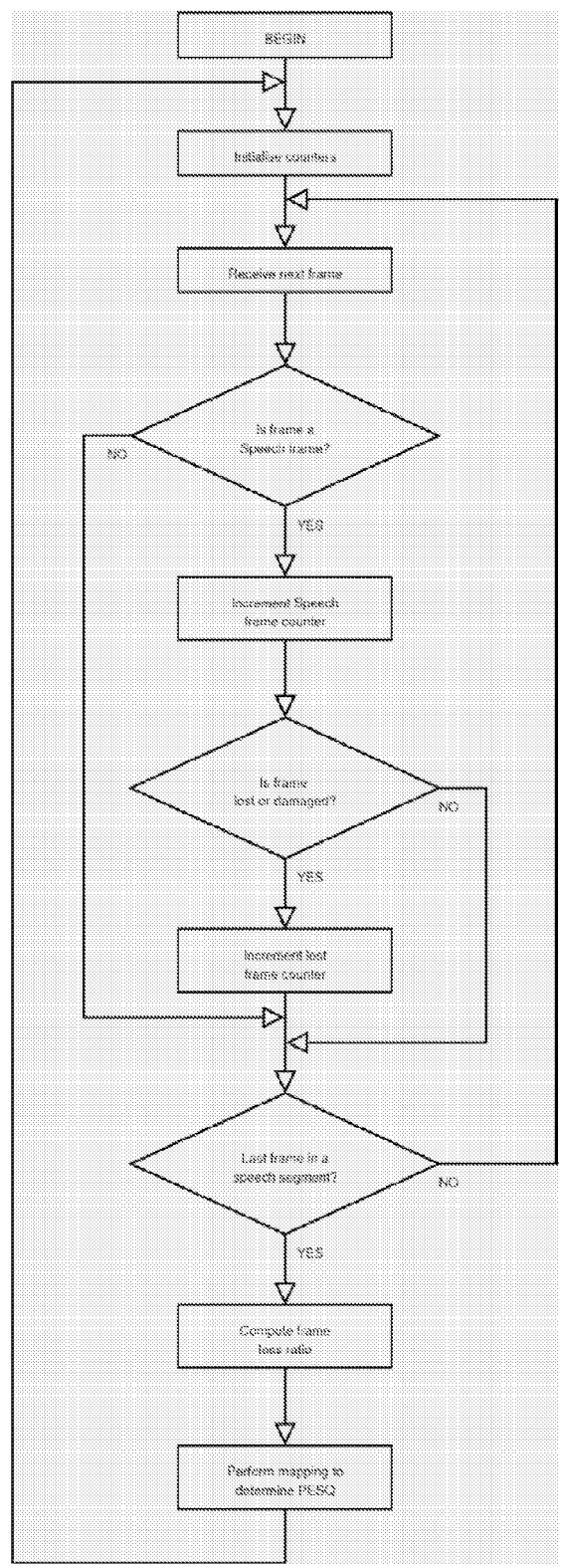
FIG. 2 is a flow diagram illustrating a method of determining a speech quality estimate in a UMTS network.

In a Universal Mobile Telecommunications System (UMTS) network, the "user plane" is used to carry data streams of user generated information such as speech or data. The user plane consists of both the actual user generated data streams and the data bearers used to transport the data streams. It is important to understand how user plane protocols work, as besides transporting speech they also carry valuable information regarding the quality of the connection. The interoperability of the Iu and Nb user plane protocols is shown in FIG. 1. The Iu user plane protocol is used to transfer Radio Access Bearers (RABs) containing user generated data on the Iu interface between the UMTS Terrestrial Radio Access Network (UTRAN) and the UMTS Core Network (CN), more precisely between the Radio Network Controller (RNC) of the UTRAN and the Circuit Switched Media Gateway (CS-MGW) of the CN. The Nb user plane protocol is used on the Nb interface within the CN between the CS-MGW:s. The functionality inside the Iu and the Nb user plane protocols is identical for the most part. The major difference is that the protocols are used on different interfaces.

With reference to FIG. 1, the RNC transforms the user plane protocols used in the RNC into an Iu user plane format, and uses a data bearer to transport the Iu frames to the CN. The CS-MGW terminates the Iu frames sent by the RNC and possibly processes the payload. Finally, the CS-MGW frames the payload into an Nb user plane format and sends it to another CS-MGW in the CN. The Iu and Nb user plane protocols are designed to be data bearer independent. This means that the user plane can be easily adapted to use different transport technologies.

Iu and Nb user plane protocols allow the sending entity to include in the frame header a sequence number and a checksum calculated over the contents of the frame. When the peer Iu/Nb protocol entity receives the frame, it first checks the header checksum and discards the frame if the checksum is bad. If the header checksum is correct, but the payload is damaged, the frame's FQC field is set to "Bad". This information can be used to estimate speech quality. An algorithm for estimating speech quality of a voice call is as follows, where the algorithm can be implemented at either an RNC or a CS-MGW (or at a separate network analyser used as a probe) within the call chain.

A voice call is divided into measurement intervals, for example 5 second periods. Certain counters are maintained for the measurement intervals. The codec type of the call is determined, and any associated parameters, e.g. bit-rate. In particular, one counter is maintained for the number of received speech frames and one is maintained for the number of lost and, optionally, damaged speech frames. The counters are reset at the beginning of each new measurement period. Lost frames are detected based on the frame number field in the frame header.

Iu Case

From an Iu frame header it is possible to detect the frame content, i.e. silence or speech, based on the RFCI field, and whether or not the frame was damaged on the radio link based on the FQC field (GOOD, BAD, or BAD RADIO) and the checksum. Additionally, by analysing the frame numbers of the received frames it is possible to detect any lost frames. A damaged frame is considered for the purpose of quality estimation to be equivalent to a lost frame, and the lost frame counter incremented accordingly.

Nb Case

On the Nb interface, the detectable information is dependent on the call case. For a Tandem call case, the speech is transcoded by the MGW:s in the call path. Hence all the information in the Iu frame headers is lost and only frames lost on the Nb interface can be detected based on frame numbering. However, in Transcoder Free Operation (TrFO), the MGW merely copies the Iu frames into the Nb interface. Therefore all of the information in the Iu frames is also detectable on the Nb interface and it is possible to detect the frame content and radio quality also on the Nb interface, i.e. the counter records both lost and damaged frames.

The loss of a speech frame is much more significant in terms of perceived quality than the loss of a silence frame. It is therefore desirable to determine the percentage frame loss/damage relative to the number of speech frames in a speech segment, effectively discounting loss of and damage to silence frames. The type of the received Iu/Nb frames can easily be detected based on the frame header fields. [As only Iu/Nb frames with PDU Type 0 and PDU Type 1 are used to carry speech, the speech quality estimation method should ignore all the PDU Type 14 control frames received by the frame handler.]

Detecting lost frames is not as straightforward as it might seem. Although the Iu/Nb header provides frame numbering which should facilitate the detection of lost frames, the variable time intervals between silence frames complicates detection. The frame numbering can be increased either every time a frame is sent, or after constant time intervals.

In the first case, detection of the lost frames is simple: The difference between the frame numbers of the last two received frames will indicate if frames have been lost. The type of the lost frames can be determined easily based on the type of the frames before and after the losses.

In the case of time based frame numbering (which is more widely used than sequence numbering), the detection of lost frames is not as simple. When using the time based numbering to transfer AMR-coded speech, the frame numbering is stepped once in 20 ms, which means that during active speech the numbering is increased by one for every sent frame. However, during a silence period, the frame numbering is increased as well, although no actual frames are sent. This problem can be addressed by predicting the type of frames lost based upon the frames preceding and succeeding the missing frame(s), and the number of frames in the missing sequence. The prediction is based upon historical data, i.e. an analysis of which frame sequence is sandwiched between certain frames when the sequence has a given length. The lost frame counter is incremented according to the predicted number of missing speech frames.

At the end of a speech segment, the values held in the total speech frame counter and the lost/damaged frame counter are used to generate an estimate of speech quality. The number of lost/damaged frames is calculated as a percentage of the total number of speech frames. The result is applied as an input to a polynomial (third order) function to generate a speech quality estimate. This polynomial function is generated by fitting a function to empirically collected data mapping percentage frame loss to PESQ values. More particularly, the data is collected by taking (5 second) samples of speech signals and simulating frame losses at different rates on the samples. The raw speech information is then recovered by decoding the "damaged" samples, and PESQ values determined using the ITU-T recommendation P.862. If necessary, PESQ values can be mapped to MOS values, or the mapping function may be designed to map directly from the percentage frame loss to MOS values. The polynomials are specific to codec type and bit-rate. The appropriate polynomial is therefore selected based upon the codec type (e.g. PCM, AMR, etc) and, if applicable, the codec bit-rate.

In some scenarios it may be preferable to provide network operators with a quality value which represents a deviation from a maximum possible quality value for the call case type in question. As coding will always result in some degradation, the maximum PESQ value will in practice always be less than 4.5 (and the MOS value less than 5). The maximum quality value for each call case type is therefore pre-calculated, and for each estimation measurement (i.e. for each measurement interval), the determined quality value is subtracted from the maximum value, and the result presented to the operator.

It is preferable to implement the speech quality estimation algorithm at the MGW, as it is in any case a primary function of the MGW to process the speech frames transported through it. As only a few header fields per received frame need to be analysed, the speech quality of each call could be estimated in real-time without substantially affecting the capacity of the MGW. For a given voice call, the MGW will analyse frames on the Iu interface coming from the client terminal for which the MGW is the "primary" gateway, and will analyse frames on the Nb interface and sent over the core network towards that terminal. The MGW will generate two separate measures of speech quality, one for each direction, although some algorithm may be provided for combining the two measures if necessary.

It will be appreciated by the person of skill in the art that various modifications may be made to the above described embodiment without departing from the scope of the present invention. For examples, functions other than a polynomial may be used to map frame loss rate to quality estimation values, e.g. logarithmic functions.

The invention claimed is:

1. A method of estimating the quality of speech information associated with a voice call over a communication system comprising a core network and an access network wherein speech information is carried in frames between the access network and the core network and within the access network, the method comprising the steps of:
considering only frames containing speech and ignoring silent frames;
determining a rate of frame loss for the considered frames transported between the access network and the core network or within the core network: and,
mapping the rate of frame loss to a subjective speech quality estimation value using data collected by simulating frame loss on representative speech samples and determining quality estimation values for the damaged speech samples;
wherein said communication system is a Universal Mobile Telecommunications System network; and, wherein the method is implemented at the Radio Network Controller of the access network, wherein said frames are Iu frames received from a Media Gateway of the core network.

2. The method according to claim 1, further comprising the step of determining said rate of frame loss by counting the number of lost frames and the number of damaged frames.

3. The method according to claim 1, wherein the method is applied to speech segments of predefined duration.

4. The method according to claim 3, further comprising applying the method to successive speech segments of an ongoing or recorded voice call to provide a continuously-updated speech quality estimate.

5. The method according to claim 1, wherein said step of mapping the rate of frame loss to a speech quality estimation value comprises performing said mapping using an empirically-derived formula.

6. The method according to claim 5, wherein said formula is derived by fitting a polynomial or other function to said collected data.

7. The method according to claim 1, wherein said step of mapping the rate of frame loss to a speech quality estimation value comprises indexing a look-up table containing frame loss rates and respective quality estimation values.

8. The method according to claim 1, wherein said mapping is performed on a per call case basis, the method further comprising the step of determining a call case type of the voice call.

9. The method according to claim 8, wherein said call case types include codec types.

10. The method according to claim 1, wherein said speech quality estimation value is a Perception Evaluation of Speech Quality (PESQ) value.

11. The method according to claim 1, wherein said speech quality estimation value is a Mean Opinion Score (MOS) value.

12. A method of estimating the quality of speech information associated with a voice call over a communication system comprising a core network and an access network wherein speech information is carried in frames between the access network and the core network and within the access network, the method comprising the steps of:
considering only frames containing speech and ignoring silent frames;

determining a rate of frame loss for the considered frames transported between the access network and the core network within the core network: and, mapping the rate of frame loss to a subjective speech quality estimation value using data collected by simulating frame loss on representative speech samples and determining quality estimation values for the damaged speech samples;

wherein said communication system is a Universal Mobile Telecommunications System network; and, wherein the method is implemented at a Media Gateway, said Media Gateway performing the estimation on both Iu and Nb frames in order to estimate the quality of the voice call in both directions.

13. The method according to claim 12, further comprising the step of determining said rate of frame loss by counting the number of lost frames and the number of damaged frames.

14. The method according to claim 12, wherein the method is applied to speech segments of predefined duration.

15. The method according to claim 14, further comprising applying the method to successive speech segments of an ongoing or recorded voice call to provide a continuously-updated speech quality estimate.

16. The method according to claim 12, wherein said step of mapping the rate of frame loss to a speech quality estimation value comprises performing said mapping using an empirically-derived formula.

17. The method according to claim 16, wherein said formula is derived by fitting a polynomial or other function to said collected data.

18. The method according to claim 12, wherein said step of mapping the rate of frame loss to a speech quality estimation value comprises indexing a look-up table containing frame loss rates and respective quality estimation values.

19. The method according to claim 12, wherein said mapping is performed on a per call case basis, the method further comprising the step of determining a call case type of the voice call.

20. The method according to claim 19, wherein said call case types include codec types.

21. The method according to claim 12, wherein said speech quality estimation value is a Perception Evaluation of Speech Quality (PESQ) value.

22. The method according to claim 12, wherein said speech quality estimation value is a Mean Opinion Score (MOS) value.

* * * * *

UNITED STATES PATENT AND TRADEMARK OFFICE
CERTIFICATE OF CORRECTION

PATENT NO. : 8,145,205 B2  
APPLICATION NO. : 12/089660  
DATED : March 27, 2012  
INVENTOR(S) : Vaisanen et al.

Page 1 of 1

It is certified that error appears in the above-identified patent and that said Letters Patent is hereby corrected as shown below:

On the Face Page, in Field (56), under "OTHER PUBLICATIONS", in Column 2, Line 3, delete "Intenational Confernce" and insert -- International Conference --, therefor.

In Column 2, Lines 50-54, delete "Preferably, ..... estimate." and insert the same as a new paragraph, at Line 51.

In Column 3, Line 37, delete "the a UMTS" and insert -- a UMTS --, therefor.

In Column 6, Line 17, in Claim 1, delete "network:" and insert -- network; --, therefor.

In Column 6, Line 26, in Claim 1, delete "lu" and insert -- Iu --, therefor.

In Column 7, Line 3, in Claim 12, delete "network:" and insert -- network; --, therefor.

In Column 7, Line 12, in Claim 12, delete "lu" and insert -- Iu --, therefor.

Signed and Sealed this  
Third Day of July, 2012

David J. Kappos  
*Director of the United States Patent and Trademark Office*